(12) United States Patent
Leister

(10) Patent No.: US 10,578,946 B2
(45) Date of Patent: Mar. 3, 2020

(54) POLARIZATION GRATINGS FOR OBLIQUE INCIDENCE ANGLES

(71) Applicant: SEEREAL TECHNOLOGIES S.A., Munsbach (LU)

(72) Inventor: Norbert Leister, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 14/417,179

(22) PCT Filed: Jul. 26, 2013

(86) PCT No.: PCT/EP2013/065784
§ 371 (c)(1),
(2) Date: Jan. 26, 2015

(87) PCT Pub. No.: WO2014/016403
PCT Pub. Date: Jan. 30, 2014

(65) Prior Publication Data
US 2015/0205182 A1    Jul. 23, 2015

(30) Foreign Application Priority Data

Jul. 27, 2012   (DE) .................. 10 2012 106 852

(51) Int. Cl.
*G02F 1/29*       (2006.01)
*G02B 26/08*      (2006.01)
(Continued)

(52) U.S. Cl.
CPC ........... *G02F 1/292* (2013.01); *G02B 5/1833* (2013.01); *G02B 5/3083* (2013.01); *G02B 26/0808* (2013.01)

(58) Field of Classification Search
CPC ..... G02F 1/292; G02B 5/3083; G02B 5/1833; G02B 5/0808
See application file for complete search history.

(56) References Cited

U.S. PATENT DOCUMENTS

| 5,638,201 A | 6/1997 | Bos et al. |
| 2006/0001972 A1* | 1/2006 | Sato .................. G01J 3/18 |
| | | 359/569 |

(Continued)

FOREIGN PATENT DOCUMENTS

WO      2011/067265 A1      6/2011

OTHER PUBLICATIONS

Li et al. "Re-Writable Multi-Domain Liquid crystal Alignment Layers through Laser-Induced Micropatterning" JJAP vol. 45, No. 23, 2006, pp. L591-L594.*

(Continued)

*Primary Examiner* — Jessica M Merlin
(74) *Attorney, Agent, or Firm* — Saul Ewing Arnstein & Lehr LLP

(57) ABSTRACT

A polarization grating for diffractive light deflection, having at least one liquid crystal layer on a substrate, wherein the liquid crystal molecules having a periodic change in orientation. The invention further relates to a light deflection device and a method for deflecting light. A polarization grating for an oblique incidence angle of the light is specified, in particular having high diffraction efficiency for the +1st order for a specifiable or variable incidence angle in a wide range of incidence angles. A polarization grating has at least one additional orientation change of the liquid crystal molecules such a way such that light of a specified polarization has a controllable angle of incidence and experiences a specifiable phase retardation upon passing through the liquid crystal layer.

24 Claims, 7 Drawing Sheets

(51) Int. Cl.
   *G02B 5/30*   (2006.01)
   *G02B 5/18*   (2006.01)

(56) References Cited

U.S. PATENT DOCUMENTS

| | | | |
|---|---|---|---|
| 2009/0073331 A1* | 3/2009 | Shi | G02F 1/292 349/18 |
| 2010/0225876 A1* | 9/2010 | Escuti | G02B 5/3016 349/187 |
| 2012/0086903 A1 | 4/2012 | Escuti et al. | |
| 2012/0236219 A1* | 9/2012 | Kroll | G02F 1/134363 349/15 |

OTHER PUBLICATIONS

International Search Report, dated Jan. 8, 2014, and Written Opinion issued in international Application No. PCT/EP2013/065784.
Kim et al., "High efficiency quasi ternary design for nonmechanical beam-steering utilizing polarization gratings," SPIE, Bd. 7816, (Dec. 31, 2010) XP040539824.

* cited by examiner

POLARIZATION GRATINGS FOR OBLIQUE INCIDENCE ANGLES

CROSS REFERENCE TO RELATED APPLICATIONS

This application claims the priority of PCT/EP2013/065784, filed on Jul. 26, 2013, which claims priority to German Application No. 10 2012 106852.6, filed Jul. 27, 2012, the entire contents of each of which are incorporated fully herein by reference.

BACKGROUND OF THE INVENTION

The invention relates to a polarization grating for diffractive light deflection, having at least one liquid-crystal layer on a substrate or between at least two substrates, the liquid-crystal molecules having a periodic variation of their orientation. The invention also relates to a light deflection device in which at least one such polarization grating is contained, and to a method for light deflection which uses at least one such polarization grating. The invention relates to both reflective and transmissive polarization gratings, in which case reflective polarization gratings may also be formed as liquid-crystal layers on a silicon substrate (LCOS, Liquid Crystal On Silicon). The invention also relates to an apparatus for the reconstruction of holographically encoded three-dimensional scenes, and to a device for directing solar radiation onto a photosensitive surface, which respectively contain at least one such polarization grating.

Diffractive light deflecting means have a wide range of use. They may for example be used for passive and active beam or wavefront shaping, or generally as diffractive optical imaging means. They can be produced wavelength- and/or angle-selectively, so that beam combination or beam splitting can be carried out with them, as is for example required in optical networks. Advantageously, they can be used for the tracking of a small observer region onto the eyes of a user in a stereoscopic or holographic display. Another field of application consists, for example, in the concentrating and/or tracking of solar radiation onto a photosensitive surface.

Polarization gratings for light deflection are diffraction gratings with a fixed or variable grating period. In diffraction gratings, at a predetermined wavelength λ of the light, the grating period Λ establishes the angle of deflection $\beta_m$:

$$\beta_m = \arcsin\left(\frac{m\lambda}{\Lambda} - \sin(\alpha)\right)$$

In this case, m is an integer which indicates the diffraction order, and α is the angle of incidence, or entry angle.

In general, diffraction gratings may have a periodic surface structure (surface relief gratings) or the optical properties may vary periodically within the layer influencing the light. The periodic optical properties may influence the amplitude and/or the phase and/or the polarization of the light.

In a diffraction grating, the strength and the profile of the optical variation determine the diffraction efficiency with which the light is deflected into the individual diffraction orders. The diffraction efficiencies are also dependent on the angle of incidence into the polarization grating, since the effective optical properties vary with the angle of incidence. For most applications, however, a high diffraction efficiency, also referred to as diffraction effectiveness, is required over a wide range of the angles of incidence.

Polarization gratings—unlike for example surface relief gratings—have the property that it is possible to obtain almost 100% diffraction efficiency in a single diffraction order. In contrast to other grating types with a high diffraction efficiency, such as volume gratings, which constitute so-called thick gratings, polarization gratings can be formed as thin gratings. The term thin grating relates to the fact that the thickness of the layer acting as a diffraction grating is less than its period. In a thick grating, the thickness of the layer acting as a diffraction grating is much greater than its period.

In comparison with other grating types which allow a high diffraction efficiency, for example volume gratings (volume Bragg gratings), which have a narrow angle of incidence range, polarization gratings can have a high diffraction efficiency for a relatively wide angle of incidence range. This angle range may for example be ±15° or even ±20°. Nevertheless, this is not sufficient for a number of applications.

Polarization gratings can be configured as passive gratings, as switchable gratings with a fixed grating period or as gratings whose grating period can be controlled.

The present invention relates primarily to switchable and controllable polarization gratings, but may also be used for passive gratings. Switchable gratings with a fixed grating period are often produced in a thin birefringent, i.e. optically anisotropic, liquid-crystal layer (LCPG—Liquid-Crystal Polarization Grating), which is located between two substrates acting as a boundary of the liquid-crystal cell. Light which does not travel in the direction of the crystal optical axis of the liquid-crystal molecules accordingly experiences a positive or negative phase retardation of the extraordinary ray relative to the ordinary ray, depending on whether the birefringence of the liquid-crystal material is positive or negative, this retardation being greatest when the light ray travels perpendicularly to the crystal optical axis. Positive birefringence in this case means that the difference between the refractive indices $\Delta n_p$ for the extraordinary ray $n_e$ and the ordinary ray $n_o$ is greater than zero ($\Delta n_p = n_e - n_o > 0$), and negative birefringence means that this difference $\Delta n_n$ is less than zero ($\Delta n_n = n_e - n_o < 0$). By suitable alignment of the liquid-crystal molecules in the liquid-crystal layer, or relative to one another, a phase change of the two elementary rays with respect to one another, and therefore of the polarization state of the light travelling through the liquid-crystal layer, can therefore be achieved. The desired alignment of the liquid-crystal molecules may, for example, be adjusted during the production of the liquid-crystal cell. To this end, the gratings have alignment layers on one or both substrate sides, which lead to suitable alignment of the liquid-crystal molecules in the active liquid-crystal layer. In polarization gratings with a fixed grating period, the alignment layers are structured periodically in correspondence with the grating spacing, i.e. the grating period. Such alignment layers may, for example, be produced via polymerization of a photosensitive polymer by irradiation with a suitable exposure distribution, as described for example in U.S. Pat. No. 7,196,758 B2 or in International Patent Application WO 2006/092 758 A2. On the alignment layers, the liquid crystals are aligned with their crystal optical axes in such a way that a periodic variation of the polarization state of the light passing through is achieved.

The alignment layers may also be structured by shaping the alignment pattern with the aid of micro-structured templates.

Switchable LCPGs with a fixed grating period have an electrode structure which is formed on the substrates. It may be formed uniformly or structured, in order to permit position-dependent switching. By application of a suitable voltage to the electrode structure, the liquid-crystal molecule alignment imposed by the alignment layer can be removed, so that the mutual orientation thereof is lost, or the crystal optical axis comes to lie in the light propagation direction. The birefringence of the liquid-crystal layer is removed, and the polarization grating therefore becomes inactive, so that light only leaves the liquid-crystal layer undeviated, i.e. into the $0^{th}$ diffraction order.

Passive polarization gratings may be produced in a similar way as switchable gratings with a fixed grating period, likewise by using liquid-crystal molecules. In this case, the liquid molecules may for example be embedded in a polymerizable monomer, which is polymerized after its alignment so that the alignment state is frozen in. In this case, it is also possible to operate only with a substrate and an alignment layer (WO 2006/092 758 A2).

Passive and switchable gratings with a fixed grating period have a fixed angle of deflection at a predetermined wavelength.

Gratings whose grating period can be controlled are described, for example, in International Application WO 2011/067 265 A1 of the same Applicant. They have a fine-structured, individually drivable electrode structure on one or more substrate sides. By applying an electric field in the plane of the liquid-crystal layer (in-plane), the rotation angle of the liquid-crystal molecules can be influenced. This may, for example, be achieved by applying a voltage to a neighboring electrode pair, which lies on one substrate side. By applying a suitable periodic voltage profile to the electrode structure, the desired alignment of the liquid-crystal molecules is achieved in the active layer, which lies between two substrates, so that adequate periodic variation of the polarization state of the incident light takes place. In this case, for a predetermined wavelength and a predetermined angle of incidence, the period of the voltage profile determines the angle of deflection. For example, the electrodes may be arranged in the form of a comb on a substrate. A voltage profile which acts in the plane of the liquid-crystal layer, and leads to a variation of the alignment of the liquid crystals in the liquid-crystal layer, may be applied to such an electrode structure. The alignment of the liquid crystals in the voltageless state is in this case likewise induced by one or more alignment layers, which in this case may also be unstructured.

With this type of gratings, the angle of deflection can be modified by varying the grating period.

Polarization gratings may operate reflectively or transmissively. A reflective polarization grating is described, for example, in U.S. Pat. No. 6,924,870 B1.

Polarization gratings with a fixed grating period may be structured with small grating periods, and therefore large angles of deflection. For polarization gratings with an adjustable grating period, the maximum resolution achievable in the structuring of the electrode structure, and the individual driving thereof, limit the maximum achievable angle of deflection.

From liquid-crystal display screens, arrangements of nematic liquid crystals which have a twist, so-called twisted nematic (TN) modes, are also known. In a TN liquid-crystal cell, the orientation of the alignment layers on the two substrates differs, for example by 90°. Owing to the elastic energy of the liquid crystals, continuous twisting over the liquid-crystal layer is then set up. Cholesteric liquid-crystal phases, which contain chiral molecules and form a helical structure of their orientation, are also known. Such a helical structure likewise has a twist. Often, therefore, TN liquid-crystal mixtures also have an admixture of chiral dopants, i.e. the doped liquid-crystal molecules do not have a rotation mirror symmetry axis. These dopants induce twisting of the liquid crystal. The twisting in the TN cell is then not only caused by the orientation on the alignment layers, but is also reinforced by the tendency of the liquid crystals to form a twisted structure anyway.

In a polarization grating with a fixed grating period, there is a periodic variation of the orientation of the alignment layers. If the alignment layers on the two sides of such a polarization grating are displaced laterally relative to one another in terms of their structuring, then the alignment can vary along the surface normal of the liquid-crystal layer, i.e. the molecules experience an additional twist along the surface normal. Over the range of one grating period, the orientation on an alignment layer varies by 350°. For example, a 90° twist from one alignment layer to the other then corresponds to a lateral displacement of the orientation of the two alignment layers with respect to one another by one fourth of a grating period.

Since chiral liquid-crystal mixtures already have a twist, such a twisted liquid-crystal layer can even be set up when only one alignment layer is provided. This makes it possible to produce polarization gratings with a fixed grating period, in which the orientation of the liquid molecules has a twist and which only require one substrate, when the liquid-crystal molecules are for example bound in a polymer matrix. The twist angle can in this case be adjusted through the composition of the material, that is through the quantitative proportion and the type of the chiral dopant.

International Patent Application WO 2008/130 555 A1 describes a polarization grating with a twist. The use of chiral dopants is likewise described therein, in order to obtain a polarization grating with a twist on a single alignment layer. Two-layer polarization gratings with different periodic alignment layers on a substrate and between the two passive liquid-crystal layers are also described. The two liquid-crystal layers have, for example, an opposite twist and have achromatic properties, i.e. they have a high diffraction efficiency at a plurality of wavelengths. However, they have a high diffraction efficiency only for a narrower angle of incidence range.

The liquid-crystal molecules may also have a tilt relative to the plane of the liquid-crystal layer. Such a tilt angle may, for example, be adjusted or controlled by an electric field transverse to the plane of the liquid-crystal layer. Such a field may be generated by applying an electric voltage to an electrode pair, each electrode being located on one of the two substrate surfaces.

Polarization gratings may be configured in such a way that the light is preferably diffracted with almost 100% efficiency into the $+1^{st}$ or $-1^{st}$ diffraction order, dependent on the polarization state of the incident light.

The diffraction efficiency $n_{\pm 1}$ for the $\pm 1^{st}$ order is calculated for a grating with a layer thickness d and the birefringence $\Delta n$ of the liquid-crystal layer as:

$$\eta_{\pm 1} = \frac{1 \mp S'_3}{2} \sin^2\left(\frac{\pi \Delta n d}{\lambda}\right)$$

where $S_3'$ is the normalized Stokes parameter $S_3/S_0$. The Stokes parameters $S_0$-$S_3$ describe the polarization state of the incident light.

For circularly polarized light, therefore, a diffraction efficiency $n_{\pm 1}$ of 100% is achieved when the birefringence is $\Delta n=\lambda/2d$. If, for example, the incident light is right-circularly polarized, then $S_3'=-1$ and all light is diffracted into the $1^{st}$ diffraction order. Regarding its thickness, such a polarization gracing corresponds to a $\lambda/2$ plate. In contrast to a $\lambda/2$ plate with a fixed optical axis, however, in the case of polarization gratings the angle of the optical axis in the grating plane varies locally. This angle rotates through 180° within one grating period. When passing through the birefringent liquid-crystal layer, the light experiences a relative phase change corresponding to a $\lambda/2$ plate, so that it is left-circularly polarized after leaving the plate. Left-circularly polarized light would, corresponding to $S_3'=1$, be diffracted into the $-1^{st}$ diffraction order, and would leave the grating as right-circularly polarized light. The diffraction efficiency $\eta_0$ of the $0^{th}$ order is calculated as:

$$\eta_0 = \cos^2\left(\frac{\pi \Delta n d}{\lambda}\right)$$

It is independent of the polarization state of the incident light. For a birefringence $\Delta n=\lambda/2d$, the $0^{th}$ diffraction order is substantially suppressed. For a birefringence different to $\Delta n=\lambda/2d$, the $0^{th}$ diffraction order is present. With a suitable selection of the polarization state of the incident light (circularly polarized), however, the polarization state of the $0^{th}$ order differs from that of the $\pm 1^{st}$ order. If, for example, the incident light is left-circularly polarized, then the $0^{th}$ order is likewise left-circularly polarized but the $-1^{st}$ order is right-circularly polarized, and the $+1^{st}$ order has an intensity close to 0. This can advantageously be used for filtering of the diffraction orders. A circular polarizer, which is arranged downstream of the polarization grating, may for example block the $0^{th}$ order and transmit the $-1^{st}$ order.

With a given layer thickness, the diffraction efficiency is thus dependent on the wavelength and the birefringence.

An efficiency of close to 100% in the $+1^{st}$ or $-1^{st}$ diffraction order is ordinarily achieved only for normal incidence of the light. With an oblique angle, the efficiency decreases, and at the same time the undesired fraction of the undiffracted light of the $0^{th}$ order usually increases.

Polarization gratings may also be produced with a plurality of layers. In this case, for example, the alignment pattern of the liquid-crystal molecules of the individual layers may differ from one another, or be displaced relative to one another. Such arrangements are for example likewise described in International Patent Application WO 2006/092 758 A2 or in International Patent Application WO 2008/130 561 A1, in order for example to obtain polarization gratings which have a high diffraction efficiency for a wide wavelength range (achromatic polarization gratings).

If the direction of incidence of the light varies, than the effective layer thickness also varies. This effect increases when the angle of incidence becomes greater. However, the effective birefringence of the liquid-crystal layer (LC layer) also varies for light which passes through the cell obliquely with respect to the orientation of the liquid-crystal molecules (LC molecules). It becomes less with oblique transit. In general, this effect dominates that of the greater geometrical layer thickness, so that the effective optical path length for oblique transit is less. If the liquid-crystal molecules are modified in their orientation by an electric field, then, in the case of a pixel with a uniform liquid-crystal orientation, this may for example lead to the effective birefringence becoming greater for light which is incident obliquely from the left and the effective birefringence becoming less for light which is obliquely incident from the right. In a conventional liquid-crystal cell for amplitude modulation, in some technologies a structure with a plurality of subregions of different liquid-crystal orientation is used in order to compensate for this effect (multidomain structure).

In a polarization grating with periodic orientation of the LC molecules, a tilt of the LC molecules out of the plane of the substrates would cause a periodically variable effective optical path length for the obliquely incident light. The grating is then no longer a pure polarization grating, but instead is additionally superimposed with components of different grating types. In general, almost 100% diffraction efficiency is therefore not achieved in an individual diffraction order.

In devices in which a plurality of focusing or light-deflecting components are used in series, however, light which has already been deflected by a preceding component sometimes strikes the subsequent elements obliquely. For example, a holographic display may contain a plurality of components in succession for focusing light and for observer tracking. Light may, for example, first be focused by a field lens and then obliquely strikes a polarization grating, the task of which is to deflect the light further.

If a plurality of controllable elements in series are used, then the angle at which the light strikes the last element may vary depending on the way in which the preceding elements are driven. These controllable elements may, for example, be a stack of polarization gratings in which the overall angle of deflection is generated by a different combination of the angles of deflection of individual gratings.

In general, the entry or incidence angle of the light into a polarization grating may, for example, be adjusted or varied by a combination of different diffractive elements, such as volume gratings, or refractive elements, such as prisms, which are arranged in the light path before the polarization grating.

Also, for example, in solar applications the angle of incidence may vary with the position of the sun.

SUMMARY OF THE INVENTION

It is an object of the present invention to provide and refine a diffractive optical element of the type mentioned in the introduction, by which the aforementioned problems are overcome. In particular, a high diffraction efficiency for the $\pm 1^{st}$ order should be achievable for a predeterminable or variable angle of incidence in a wide angle of incidence range.

The object is achieved according to the invention by the teaching of patent claim 1. Further advantageous configurations and refinements of the invention may be found in the dependent claims.

According to the invention, a polarization grating for diffractive light deflection is provided, having at least one liquid-crystal layer on a substrate, the liquid-crystal layer containing liquid-crystal molecules with a periodic variation, in one or two mutually orthogonal directions within the plane of the liquid-crystal layer, of their orientation, characterized in that at least one further orientation variation of the liquid-crystal molecules is adjusted or adjustable in such a way that light of a predetermined polarization with a predeterminable or controllable angle of incidence experiences a predeterminable phase retardation when passing through the liquid-crystal layer.

The polarization grating may be a polarization grating for fixed or switchable or controllable light deflection, which contains at least one liquid-crystal layer on a substrate, or alternatively between at least two substrates. The liquid-crystal layer contains liquid-crystal molecules, the liquid-crystal molecules having a periodic variation of their orientation with respect to one another in one direction or in two mutually orthogonal directions within the plane of the liquid-crystal layer. Furthermore, at least one further orientation variation of the liquid-crystal molecules is adjusted in a predetermined or controllable way, such that light of a predeterminable or predetermined polarization with a predeterminable or controllable angle of incidence experiences a predeterminable phase retardation when passing through the liquid-crystal layer. The further orientation variation to be adjusted for the liquid-crystal molecules need not itself lie in the plane of the liquid-crystal layer, as constituted for example by an adjustment or variation of the tilt of the liquid-crystal molecules relative to the plane of the liquid-crystal layer. Besides the adjustment or control of the tilt, alternatively or simultaneously, for example, also the twist of the liquid-crystal molecules between the two substrates may be adjusted or controlled. By the adjustment or control of the orientation of the liquid-crystal molecules, furthermore, an adaptation of the diffraction efficiency to the incident wavelength spectrum may also be carried out.

In an advantageous embodiment, in the polarization grating according to the invention, the light experiences a maximum diffraction efficiency in the $+1^{st}$ or $-1^{st}$ diffraction order when passing through the liquid-crystal layer. To this end, it is advantageous that the birefringence of the liquid-crystal molecules is constant in the section of the liquid-crystal layer through which the light respectively passes, i.e. the liquid-crystal molecules are all oriented in the same way in the section through which the light passes.

Polarization gratings may be configured as passive gratings, as switchable gratings with a fixed grating period, or as gratings whose grating period is controllable.

In one embodiment of the polarization grating according to the invention, it is formed as a grating whose grating period can be controlled, with a controllable periodic variation, within the plane of the liquid-crystal layer, of the orientation, and at least one further controllably adjustable orientation variation.

In another embodiment of the polarization grating according to the invention, it is formed as a passive grating with a fixed periodic variation, within the plane of the liquid-crystal layer, of the orientation, and at least one further orientation variation adjusted in a fixed way.

In a further embodiment of the polarization grating according to the invention, it is formed as a switchable grating with a fixed periodic variation, within the plane of the liquid-crystal layer, of the orientation, and at least one further switchably or controllably adjustable orientation variation.

In the polarization gratings considered here, the polarization-influencing optical properties vary primarily periodically in an optically active plane, which is located on a substrate or between at least two substrates. In general, the substrates are arranged mutually parallel. They may, however, have a spacing varying over the surface, in order for example to locally vary the strength of the periodic variation of the optical properties. Furthermore, the substrate or the substrates may also have a curvature.

In a display with parallel but oblique illumination at a known angle, the oblique incidence can therefore be compensated for by suitable driving of the LC molecules. A high diffraction efficiency can thereby be achieved.

Advantageously, the polarization grating is configured in such a way that the orientation of the liquid-crystal molecules in the plane of the at least one liquid-crystal layer, as one part of the overall orientation, and the orientation of the liquid-crystal molecules outside the plane of the liquid-crystal layer, as a further part of the overall orientation, determine the profile of the birefringence of the liquid-crystal layer as a function of position. The orientation of the liquid-crystal layer in this case varies periodically in one or two directions of the liquid-crystal plane in order to form a polarization grating.

This variation may, for example, also take place along concentric circles. By adjusting or controlling the orientation of the liquid-crystal molecules outside the plane of the liquid-crystal layer, for example by a corresponding tilt angle relative to the plane of the liquid-crystal layer, the birefringence can be locally adjusted in such a way that the light is diffracted with as far as possible maximum efficiency for the desired wavelength and the desired entry angle into the liquid-crystal layer. A circular arrangement may thus, for example, advantageously be used in an optical system which is not illuminated in a collimated fashion, as is the case for example in optical systems with multiple imaging.

In general, when passing through a birefringent layer, circularly polarized light experiences a phase change which is proportional to the rotation angle of the optical axis of this birefringent layer. In the case of a polarization grating, this rotation angle continuously varies periodically along the birefringent layer, so that light rays have a periodic phase change relative to laterally offset light rays. Such a periodic phase change leads to the diffraction and therefore the deflection of the light. If a light ray travels obliquely through a conventional polarization grating not having a twist, however, then the light ray strikes different orientations of the liquid crystals, i.e. different phases, at different depths in the liquid-crystal layer. This leads to a kind of smoothing or blurring of the profile of the phase modulation, which then differs from a prism and thus reduces the diffraction efficiency.

According to the invention, the introduction of an additional twist sets up a state in which an obliquely travelling light ray strikes the same orientation of the liquid crystals at every depth in the liquid-crystal layer. Blurring of the profile of the phase modulation is thereby prevented.

The polarization grating may accordingly be configured in such a way that the liquid-crystal molecules in the plane of the liquid-crystal layer are periodically rotated relative to one another at least in one direction, and additionally have a twist perpendicularly to the liquid-crystal layer, the rotation angles of the twist being displaced along the liquid-crystal layer in such a way that light rays with a predeterminable angle of incidence strike positions of equal rotation angle when passing through the liquid-crystal layer. If the angle of incidence varies, the twist and/or the rotation of the liquid-crystal molecules in the depth of the liquid-crystal layer will be adapted in such a way that each light ray respectively only strikes liquid-crystal molecules with the same rotation angle, the rotation angles themselves varying periodically in the plane in order to form the polarization grating.

Light which strikes a polarization grating with a liquid-crystal layer of thickness d at an angle α emerges from the liquid-crystal layer laterally offset by the distance L=d*tan ($\alpha'$). In this case, $\alpha'$ is the angle at which the light ray with the angle of incidence $\alpha$ propagates in the liquid-crystal layer because of the refractive indices of the layers involved, in particular of the substrate on the incidence side and the liquid-crystal layer itself, according to the law of refraction. In such a polarization grating, the liquid-crystal orientation is advantageously adjusted in such a way that it has the same value on the lower substrate at the lateral position 0 and on the upper substrate at the lateral position $L=d*\tan(\alpha')$, this orientation rotating through 180° in the lateral direction within one grating period $\Lambda$. The twist angle $\tau$ between the upper and lower substrates is thus advantageously adjusted to the value $\tau=180°*d*\tan(\alpha')/\Lambda$.

One possible configuration of the invention is a passive polarization grating, which is optimized for a fixed angle of incidence $\alpha$ and a fixed angle of deflection $\beta$ for light of the wavelength $\lambda$, the twist being adjusted by means of the concentration and type of a chiral dopant, which is admixed with the liquid-crystal layer. The liquid-crystal molecules may in this case be embedded in a polymerizable monomer. During production of the polarization grating, after the application of the polymerizable monomer on a substrate having an alignment layer, the monomer can be polymerized after alignment of the liquid-crystal molecules on the alignment layer. The chiral dopant, and its concentration in the liquid-crystal layer, is in this case selected in such a way that the twist angle $\tau=180°*d*\tan(\alpha')/\Lambda$ is adjusted over the whole the by means of the layer thickness d of the liquid-crystal layer. In this case, the grating period $\Lambda$ is related to the deflection angles by $\Lambda=\lambda/(\sin(\alpha)+\sin(\beta))$.

A further possible configuration of the invention is a passive polarization grating, which is likewise optimized for a fixed angle of incidence $\alpha$ and a fixed angle of deflection $\beta$. In this case, a liquid-crystal layer is oriented between 2 substrates, each having an alignment layer. The alignment layers on the two sides of the liquid-crystal cell are displaced laterally with respect to one another in relation to their structuring, preferably by the amount $I=d*\tan(\alpha')$. The liquid molecules are for example embedded in a polymerizable monomer, which is polymerized after their alignment.

The thickness of the liquid-crystal layer of a polarization grating may advantageously be adapted to a preferred angle of incidence and a preferred wavelength in such a way that the phase change of the light between ordinary and extraordinary rays substantially corresponds to one half of the wavelength at this angle of incidence and this wavelength.

In a particular variant of one of the embodiments mentioned above, the lateral offset of equal rotation angles of the twist between the upper and lower sides of the liquid-crystal layer corresponds substantially to one half of the grating period. The twist is thus 90°. In this case, the polarization grating is equally optimized for incidence at an angle $\alpha$ as well as $-\alpha$. It may, for example, therefore advantageously be used in a polarization grating stack in which a first grating is configured for normal incidence and deflects by the angle $\beta_1=\alpha_2$ or $\beta_1=-\alpha_2$, depending on the incident polarization. In both cases, it is advantageous to optimize a second grating for the further light deflection to this oblique incidence.

Another possible configuration of the invention is a switchable polarization grating, which is provided with at least one optically rewritable alignment layer. With a varying angle of incidence $\alpha$, by suitable exposure in the photosensitive alignment layer, its alignment pattern is displaced laterally by $d*\tan(\alpha)$ relative to the second fixed or variable alignment layer. A modified orientation of the liquid-crystal layer is correspondingly adjusted. The exposure may, for example, be carried out by UV light with an interference pattern. If the two layers are optically variable, the grating period may additionally be configured adjustably. To this end, the two alignment layers may have a different spectral sensitization. The exposure units for the variation of the alignment layers may also be configured in such a way that the light directed onto the two layers is focused separately, and the light not focused onto a layer remains below the sensitization threshold of this alignment layer. It is also possible to combine an optically rewritable alignment layer with a liquid-crystal layer which contains an electrode structure for adjusting the grating period, the optical writing pattern for the photosensitive alignment layer being adapted to the current grating period.

With the aid of a suitable electrode structure, which may be located on one or both substrates, polarization gratings can be configured switchably. By applying a voltage to the electrode structure, the orientation of the liquid-crystal molecules may in this case be modified in such a way that no birefringence occurs in the ray direction, or that the diffraction efficiency is influenced. Such a polarization grating may also be used as a light modulator if suitable measures are taken to suppress the undesired diffraction order, such as polarization filters and/or diaphragm apertures. Such a light modulator may also be subdivided in one or two directions into individual modulator cells.

One possible configuration of such a switchable polarization grating with a fixed grating period, which is optimized for a variable angle of incidence $\alpha$ and a fixed angle of deflection $\beta$, may have an alignment layer with fixed structuring on one substrate and on the second substrate a comb-like electrode structure for twisting the liquid molecules relative to this alignment layer, in order respectively to permit a high diffraction efficiency as a function of the angle of incidence $\alpha$.

It is particularly advantageous to use a polarization grating with a variably adjustable grating period, i.e. a variable angle of deflection $\beta$, which is configured for a variable angle of incidence $\alpha$. Although the gratings with a hybrid alignment described in International Patent Application WO 2011/067 265 A1 by the Applicant make it possible to adjust a variable grating period, the liquid-crystal layers described therein have a perpendicular alignment of the liquid-crystal molecules on an alignment layer. The adjustment of a variable grating period by an electric field for this alignment is possible only close to the substrate with the in-plane (horizontal) orientation of the liquid crystals. In the arrangement described therein, it is therefore not possible to adjust a twist. According to the invention, the liquid-crystal molecules of the liquid-crystal layer of the polarization grating therefore have a bent structure (bend). In this case, the liquid-crystal molecules of the liquid-crystal layer are oriented almost horizontally near the two alignment layers, but approximately perpendicularly in the middle of the liquid-crystal layer. This alignment has the same advantages as the arrangement described in Application WO 2011/067 265 A1. By electrode pairs which are respectively located on the two substrates, it is additionally possible to adjust a variable twist by laterally displacing the voltages applied to the electrodes on the upper and lower substrate with respect to one another according to the angle of incidence.

The adjustment or control of the orientation of the liquid-crystal molecules, and therefore of the effective birefringence for the light passing through the liquid-crystal layer at the desired angle of incidence is in this case carried out such that the ordinary and extraordinary components of the light rays receive a phase difference such that the diffraction of the light takes place as far as possible with optimal effectiveness in the desired direction. The adjustment values necessary therefor may be determined experimentally or obtained by simulation calculations.

If controllable variation of the orientation is carried out, the control parameters necessary therefor may also be determined by optical sensors which may be arranged at least in a sub-region of the diffracted light, in order to record the maximum brightness of the diffracted light. The necessary control parameters may be adjusted, for example, by a system controller which is present in the system, containing the polarization grating. This system controller may also, for example, switch on or control the desired diffraction angle.

The control parameters are preferably determined for the central wavelength of the light wave spectrum which is intended to be diffracted by the polarization grating. If the polarization grating is operated with different light spectra in a time division multiplex method, for example for applications in a color display, it is advantageous to determine the adjustment parameters separately for each wavelength spectrum and to drive the polarization grating with the associated adjustment parameter according to the time sequence of the spectra.

In gratings with a fixed grating period, the twist is generally the same for different wavelengths. Nevertheless, for example, the tilt of the liquid crystals could vary. In gratings with a variable period, for example, the grating period may respectively be adapted to the wavelength in order to obtain a fixed angle of deflection. The twist therefore also varies.

In polarization gratings whose diffraction angle varies in one or two directions, for example in order to implement a focusing function, it is advantageous to separately determine or adjust the adjustment parameters for the respective entry position.

The polarization grating according to the invention may be provided with a fixed grating period. Here, a fixed grating period means that the local profile of the grating period is not variable and establishes the local diffraction angle for a predetermined wavelength and a predetermined angle of incidence of the light. The orientation of the liquid-crystal molecules may in this case be adjusted in such a way that the diffraction of the light as far as possible takes place with maximum effectiveness in the desired direction. Advantageously, the grating is configured in such a way that the orientation of the liquid crystals is controllable, so that the effective birefringence of the liquid-crystal layer can be adapted to a predetermined angle of incidence in such a way that the light is diffracted, i.e. deflected, with the maximum possible effectiveness. The control of the orientation of the liquid-crystal molecules is advantageously carried out by applying a variable voltage profile to a suitable electrode structure. The electrode structure in this case depends on the structuring of the alignment layers and the required influencing of the orientation of the liquid-crystal molecules. The twist of the liquid-crystal molecules may in this case be varied by an electric field in the plane of the liquid-crystal layer, as may be achieved by applying a voltage to electrode pairs which are located on a common substrate. The field must then be applied in such a way that the molecules are rotated out of the orientation predetermined by the alignment layer. A field profile perpendicular to the liquid-crystal layer may be achieved by applying a voltage to electrodes between the two substrates. In this way, the tilt angle of the liquid-crystal molecules with respect to the liquid-crystal layer can be adjusted. In general, this tilt angle is also not uniform over the depth of the liquid-crystal layer when a voltage is applied, since the two bounding substrate surfaces as disturbing elements predetermine an orientation. An average or effective tilt angle, which establishes the birefringence, is therefore effective. In the case of oblique transit of the light through the polarization grating, the voltage at the electrodes for switching off the grating should be set in such a way that the optical axis of the crystal points in the light direction, i.e. that no birefringence is present. In the switched-on state, the voltage is to be selected in such a way that the required birefringence is adjusted for maximum diffraction efficiency.

The polarization grating according to the invention may comprise a plurality of liquid-crystal layers lying behind one another between the two substrates, wherein equal rotation angles of the twist being displaced along the liquid-crystal layers in such a way that light rays with a predeterminable angle of incidence strike positions of equal rotation angle when passing through the liquid-crystal layers. The alignment layers, which are arranged between the individual liquid-crystal layers during the production of the polarization gratings, are to this end structured in such a way that the desired displacement of the twist is adjusted between the individual liquid-crystal layers, and therefore adapted to the angle of incidence of the light, which is locally predetermined in a fixed way.

According to the invention, the polarization grating may be configured in such a way that there is at least a second liquid-crystal layer, the sign of the birefringence of the liquid-crystal molecules of which differs from the first liquid-crystal layer, with both liquid-crystal layers having the same grating period. The two polarization grating layers are advantageously displaced with respect to one another in such a way that the optical axes are rotated locally through 90 degrees relative to one another. The thicknesses $d_1$ and $d_2$ of the two liquid-crystal layers are advantageously selected in such a way that the absolute value of the difference of the two optical path lengths for a design wavelength $\lambda$ corresponds to a half-wave plate ($|\Delta n_1 d_1 + \Delta n_2 d_2| = \lambda/2$). At the same time, the condition $a_1 * \Delta n_1 * d_1 + a_2 * \Delta n_2 * d_2 = 0$ should be complied with. In this case, $a_1$ and $a_2$ are two constants, $a_1 = (n_{o1} + n_{e1})/(2 * n_{o1}^2 * n_{e1})$ and $a_2 = (n_{o2} + n_{e2})/(2 * n_{o2}^2 * n_{e2})$. The layer thicknesses d1 and d2 are therefore calculated as $d1 = (a_2/(a_1+a_2)) * \lambda/(2 * \Delta n_1)$ and $d2 = (a_1/(a_1+a_2)) * \lambda/(2 * \Delta n_2)$. If is advantageous that the diffraction efficiency is optimized for a wide angle range with this arrangement. The aforementioned condition $a1 * \Delta n1 * d1 + a2 * \Delta n2 * d2 = 0$ ensures that angle-dependent variations of the optical paths in the first and second layers partially compensate for one another, and the overall angular dependency of the two-layer arrangement is thus reduced.

In the case of a three-layer system in which the sign of the birefringence of two layers with the thicknesses $d_1$ and $d_2$ differs from the sign of the third layer with the thickness $d_3$, the conditions $$(|\Delta n_1 d_1 - \Delta n_2 d_2 - \Delta n_3 d_3| = \lambda/2),$$

$$\Delta n_1 * d_1/(n_{o1} * n_{e1}) + \Delta n_1 * d_2/(n_{o1}^2) + \Delta n_3 * d_3/(n_{o3}^2) = 0 \text{ and}$$

$$\Delta n_1 * d_1/(n_{o1}^2) + \Delta n_1 * d_2/(n_{o1} * n_{e1}) + \Delta n_3 * d_3/(n_{o3} * n_{e3}) = 0$$

should for example be complied with, the liquid-crystal materials being selected in such a way that the condition $n_{e1} * n_{e3} > n_{o1} * n_{o3}$ is satisfied as far as possible.

Similarly as in the case of a two-layer system, such a three-layer system is configured for a wide angle of incidence range, since by the two conditions $$\Delta n_1 * d_1/(n_{o1} * n_{e1}) + \Delta n_1 * d_2/(n_{o1}^2) + \Delta n_3 * d_3/(n_{o3}^2) = 0 \text{ and}$$

$$\Delta n_1 *d_1/(n_{o1}^2)+\Delta n_1 *d_2/(n_{o1}*n_{e1})+\Delta n_3 *d_3/(n_{o3}*n_{e3})=0$$

angle-dependent variations of the optical path in the 3 individual layers compensate for one another.

Positions of equal rotation angle of the twist along the transit direction of the light through one liquid-crystal layer or the plurality of liquid-crystal layers with a predeterminable variable angle of incidence are adjusted in an advantageous configuration variant by applying a variable voltage profile to a fine-structured electrode structure of individually drivable electrodes, which is located on at least one substrate. The electrode structure may in this case be configured in such a way that the rotation angle of the twist can be controlled along one or two directions of the substrate plane, the substrate plane being parallel to the plane of the liquid-crystal layer. If control is necessary in only one direction, this may involve extended fine-structured individually drivable strip-shaped electrodes extending parallel to one another, which extend perpendicularly to the control direction over the substrate surface. If the adaptation of rotation angles of the twist is intended to be carried out in two directions, the electrodes are preferably configured cellularly as short, individually drivable electrode strips, as corresponds to the arrangement of electrodes in a liquid-crystal display for switching the liquid-crystal molecules in the display plane (In-Plane Switching, IPS). Preferably, the two substrates respectively carry their own electrode structure. The orientation of the electrode strips is in this case preferably transverse to the respective alignment of the liquid crystals on the associated substrate side in the voltage less state of neighboring electrode strips relative to one another, this alignment being established by the alignment layer assigned to the respective substrate. The alignment patterns of the two substrates may in this case respectively be rotated relative to one another at assigned positions, in order to predetermine a desired twist or the liquid-crystal molecules in the voltageless state. Correspondingly, the respective electrode strip patterns of the two substrates may likewise be rotated relative to one another. In a polarization grating with a fixed grating period, which is predetermined by periodic structuring of one or more alignment layers, the local profile of neighboring electrode pairs may also respectively be adapted pairwise to the profile of the alignment layer of the associated substrate, and therefore also to the associated cell structure, i.e. neighboring electrode pairs are rotated relative to one another in one or two directions, in which case they may additionally also be rotated relative to the second substrate. By applying a voltage difference to the electrode pairs, the crystal optical axes of the liquid-crystal molecules are aligned along the field lines. The angle difference of the rotation between the two substrate sides in this case adjusts the twist. By varying the voltage difference between the respective lower and upper electrode pair, a tilt of the crystal optical axes of the liquid-crystal molecules out of the plane of the liquid-crystal layer can additionally be adjusted. If only one substrate carries a fine-structured electrode structure and the second substrate carries a large-area common electrode, the tilt is adjusted by varying the voltage difference between the common electrode and the average voltage difference at the respective electrode pair.

Particularly advantageously, the polarization grating according to the invention is configured as a grating with a variable, i.e. controllable, grating period. To this end, the periodic variation of the alignment of the liquid crystals, influencing the polarization of the light, is adjusted by applying a periodic voltage profile to the fine-structured electrode structure, which is located at least on one substrate side. The voltage profile in this case determines the profile of the polarization variation. The level of the local voltage value with respect to a reference potential then establishes how strongly the position of the crystal optical axis varies relative to the position which is established by the associated alignment layer. The period of the voltage profile in this case determines the grating period of the phase grating, and therefore also the diffraction angle at a predetermined angle of incidence. The alignment layers are generally structured uniformly in one direction over the entire substrate surface, in which case the alignment layers of the two substrates may be rotated relative to one another, for example orthogonally with respect to one another. Without a corresponding voltage profile on the fine-structured electrode structures, a polarization grating is therefore not formed and the light leaves the layer undeflected. The alignment layers and the electrode structure may for example also be aligned circularly with respect to one another, for example in order to form a controllable diffraction lens.

The polarization grating according to the invention may be configured in such a way that the period of the variation of the orientation of the liquid-crystal molecules varies in a locally fixed or variable way in one or two directions along the substrate plane. By the local variation of the grating period, a local adaptation of the diffraction angle for a predetermined angle of incidence of the light is achieved, for example in order to produce converging or diverging properties of the polarization grating. The variation of the grating period may, however, in this case also have different values in different directions, for example in order to produce cylinder lens terms. If the polarization grating is formed circularly, then for example the period may slightly vary predeterminably in the direction of the radius, in order to vary the diffraction angle and thus obtain a converging or diverging function.

A fixed variation of the period may, for example, be achieved by a local variation of the alignment layers. In polarization gratings in which the grating period is adjustable by means of a periodic voltage profile on a fine-structured electrode structure, the period of the voltage profile may be varied locally. By local variation of the period of the fine-structured electrode grid, the achievable diffraction angle range, or the local angle resolution, may furthermore be varied. In this way, for example, the deflection range or its angle spectrum can be kept almost constant locally, when a field lens function is additionally implemented in the polarization grating.

The polarization grating according to the invention may advantageously also be configured in such a way that the adjustment of the at least one further orientation of the liquid-crystal molecules varies in a locally fixed or variable way in one or two directions along the substrate plane, or in the plane of the liquid-crystal layer. By this local variation of the orientation of the liquid-crystal molecules, the diffraction efficiency can be adapted to a locally variable angle of incidence of the light into the liquid-crystal layer.

In fixed gratings, this may for example be predetermined by a local variation of the alignment directions of the alignment layers relative to one another, so that light rays with locally different angles of incidence, predetermined in a fixed way, strike for example respectively the same rotation angle, assigned to the angle of incidence, of the twist of the liquid-crystal molecules when passing through the liquid-crystal layer. If the active layer is formed from a plurality of liquid-crystal layers arranged behind one another, the alignment layers located between these layers may also be locally adapted in such a way that light rays with locally different angles of incidence, predetermined in a fixed way, strike respectively the same rotation angle, assigned to the angle of incidence, of the twist of the liquid-crystal molecules when passing through the liquid-crystal layer.

In the case of switchable or controllable gratings, this may be done by local variation of the drive voltage responsible for the additional orientation. By varying the average voltage difference between assigned electrode pairs of the two substrates, for example, the tilt angle of the liquid-crystal molecules with respect to the liquid-crystal layer can be adjusted locally. By local variation of the voltage differences at the electrode pairs of at least one substrate side, the rotation angle of the twist can be locally adjusted.

In arrangements for one- or two-dimensional fixed or variable light deflection, at least one of the polarization gratings described according to the invention may advantageously be contained, in particular when the light entry is not intended to take place perpendicularly to the light entry surface of the light-deflecting arrangement, or when the angle of incidence varies locally or as a function of time. This is the case, in particular, when the light-deflecting arrangement is formed in multiple stages and/or has an additional imaging function.

Such a light-deflecting arrangement according to the invention is, for example, advantageously contained in a device for reconstructing holographically encoded spatial scenes, in order to track at least one small visibility range of the holographic reconstruction to the movements of the eyes of one or mere observers, in order to permit a larger observer range. To this end, such a device advantageously has a recognition system, which detects the movements of the head or the eyes of the observer or observers, and, by means of a system control, controls the at least one polarization grating and optionally further light-deflecting components in such a way that the center of the visibility range substantially coincides with the position of the assigned eye pupil.

At least one polarization grating according to the invention may also advantageously be contained in an arrangement for directing light, in particular sunlight, onto a photosensitive surface, in order to adapt the light to changing incidence directions and/or light distributions of the photosensitive surface.

In terms of the method, the object mentioned in the introduction is achieved by the use of at least one polarization grating according to the invention for full or partial one- or two-dimensional light deflection with a fixed or variable angle of deflection. Such a method may, for example, be used to track a small visibility window of a display for the reconstruction of holographically encoded three-dimensional scenes to the movement of the observer, or his eyes. To this end, a plurality of passive and/or switchable and/or controllable polarization gratings may be connected in succession, or combined with other light-deflecting means, in order to produce a large tracking range. The method may also be used to collect solar radiation or the tracking thereof onto a photovoltaic cell. Further fields of application consist, for example, in optical storage technology, illumination technology, particularly for variable illumination, the switching of optical connections in optical networks, or optical computer technology.

BRIEF DESCRIPTION OF THE DRAWINGS

There are now various possibilities for advantageously configuring and refining the teaching of the present invention and/or combining the embodiments described above—insofar as is possible—with one another. In this regard, reference should be made on the one hand to the patent claims dependent on patent claim 1, and on the other hand to the following explanation of the preferred exemplary embodiments of the invention with the aid of the drawing. In connection with the explanation of the preferred exemplary embodiments of the invention with the aid of the drawing, generally preferred configurations and refinements of the teaching will also be explained. In the drawings, schematically, are shown FIG. 1a a conventional polarization grating with normal light incidence, and FIG. 1b the conventional polarization grating with oblique light incidence, FIG. 2 the simulation of the dependency of the diffraction efficiency in a $1^{st}$ diffraction order on the angle of incidence for a conventional polarization grating, FIG. 3 a polarization grating which contains a stack of liquid-crystal layers, which are laterally displaced relative to one another and the liquid-crystal molecules of which are respectively rotated by an angle relative to one another from layer to layer, FIG. 4 the simulation of the dependency of the diffraction efficiency in a $1^{st}$ diffraction order on the angle of incidence for a polarization grating according to the invention according to FIG. 3, FIG. 5 a polarization grating having a first liquid-crystal layer with positive birefringence and a second liquid-crystal layer with negative birefringence, FIG. 6 a three-layer polarization grating having two liquid-crystal layers with the same sign of the birefringence and one liquid-crystal layer with the opposite sign of the birefringence, FIG. 7a a polarization grating without a twist of the liquid-crystal molecules, FIG. 7b the polarization grating according to FIG. 7a with an additional twist of the liquid-crystal molecules perpendicularly to the liquid-crystal layer, FIG. 7c the polarization grating according to FIG. 7b with substrates and the actual ray trace represented, FIG. 8 the simulation of the dependency of the diffraction efficiency in a $1^{st}$ diffraction order on the angle of incidence for a polarization grating according to the invention according to FIG. 7b, FIG. 9a a polarization grating with a tilt and without a twist of the liquid-crystal molecules, FIG. 9b the polarization grating according to FIG. 9a with a tilt and additional twist of the liquid-crystal molecules, FIG. 10 a polarization grating with a locally varying strength of the twist of the liquid-crystal molecules perpendicularly to the liquid-crystal layer, FIG. 11 a detail of a polarization grating with hybrid alignment, FIG. 12 a detail of a polarization grating with bent alignment, and FIG. 13 a detail of the polarization grating according to FIG. 11 with bent and twisted alignment.

DETAILED DESCRIPTION OF THE INVENTION

Figure 1A:
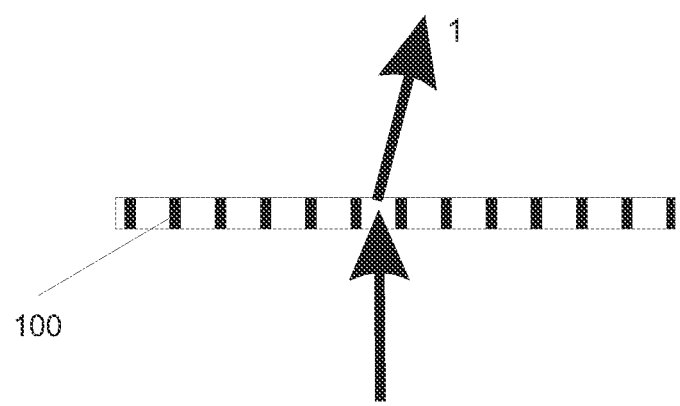

FIG. 1 shows the intensity ratios in a polarization grating 100 according to the prior art. As shown in FIG. 1a, circular polarized light, which strikes the polarization grating 100 perpendicularly, is deflected almost fully into a first diffraction order, depending on the sense of rotation of the circular polarization. Scarcely any undeflected light passes through the polarization grating 100 into a $0^{th}$ diffraction order.

Figure 1B:
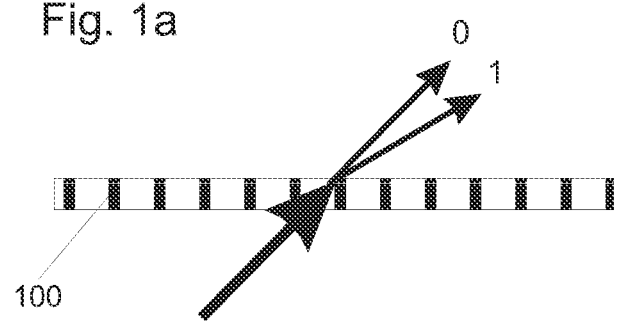

FIG. 1b shows the ratios for oblique light transit through the polarization grating 100. Only a part of the intensity is in this case deflected into a $1^{st}$ diffraction order. A significant part, conversely, passes undeflected through the polarization grating.

Figure 2:
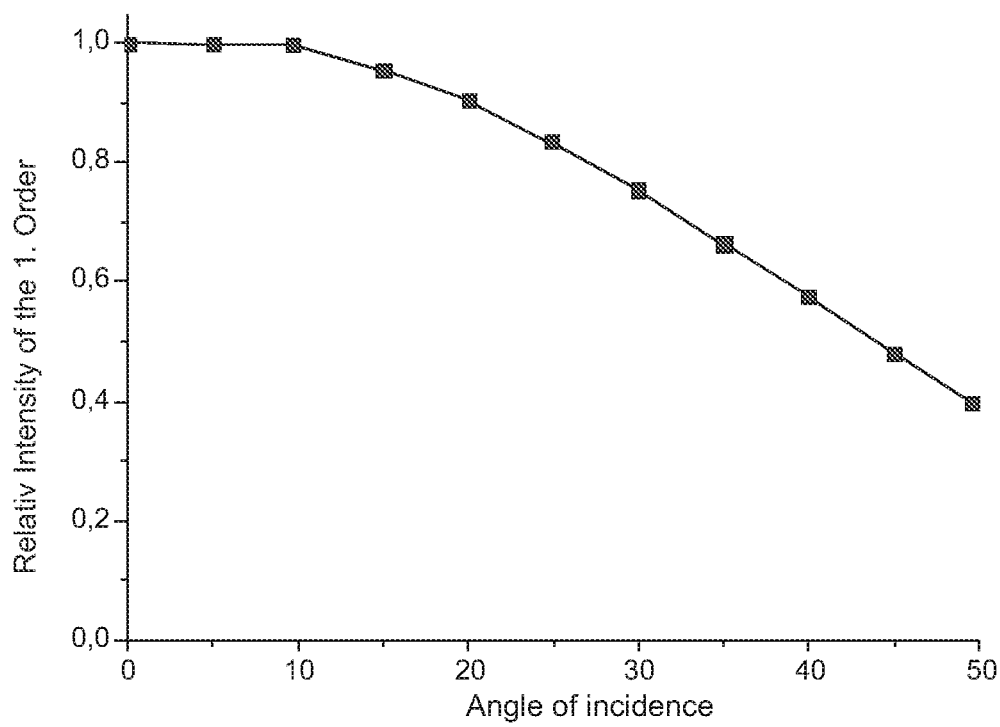

FIG. 2 illustrates the dependency of the intensity in a $1^{st}$ diffraction order on the angle of incidence when circular polarized light passes through a polarization grating according to the prior art. Simulation results are shown for a polarization grating which has been formed in a liquid-crystal layer and has a 2 µm grating period with a layer thickness of about 1.5 µm. The liquid-crystal molecules do not have a spiral twist along the axis perpendicular to the liquid-crystal layer. Such a grating has an angle of deflection of about 15° in the green spectral range for normal light incidence. Up to an angle of incidence of about 10°, very high diffraction efficiencies close to 100% still occur in the $+1^{st}$ and $-1^{st}$ orders. At higher angles of incidence, the efficiency decreases. Beyond angles of incidence of about 45° degrees, the efficiency in the $+1^{st}$ and $-1^{st}$ orders falls below 50%.

Figure 3:
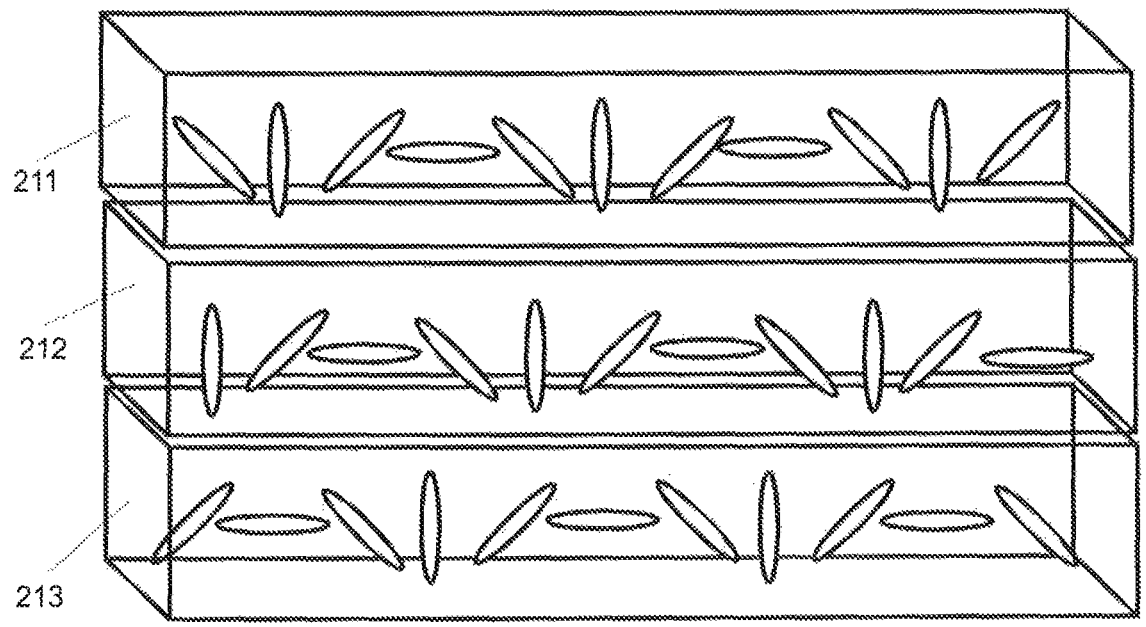

FIG. 3 shows a first exemplary embodiment of a polarization grating which has been optimized for oblique light incidence. Three liquid-crystal layers 211, 212 and 213 are located between two substrates (not represented). The layer thickness of the first liquid-crystal layer 211 and of the third liquid-crystal layer 213 are configured in such a way that the layer thickness respectively corresponds to a $\lambda/4$ plate ($\Delta n\, d=\lambda/4$). The second liquid-crystal layer 212 is configured as a $\lambda/2$ plate ($\Delta n\, d=\lambda/2$). All three layers consist of the same liquid-crystal material. The three liquid-crystal layers 211, 212 and 213 are arranged displaced laterally relative to one another in such a way that the rotation angles of the birefringence axes of the liquid-crystal molecules are respectively rotated through 45° with respect to one another from layer to layer. Such gratings may primarily be configured as passive polarization gratings. With suitable electrode structures on the substrates, they may also be configured switchably.

Figure 4:
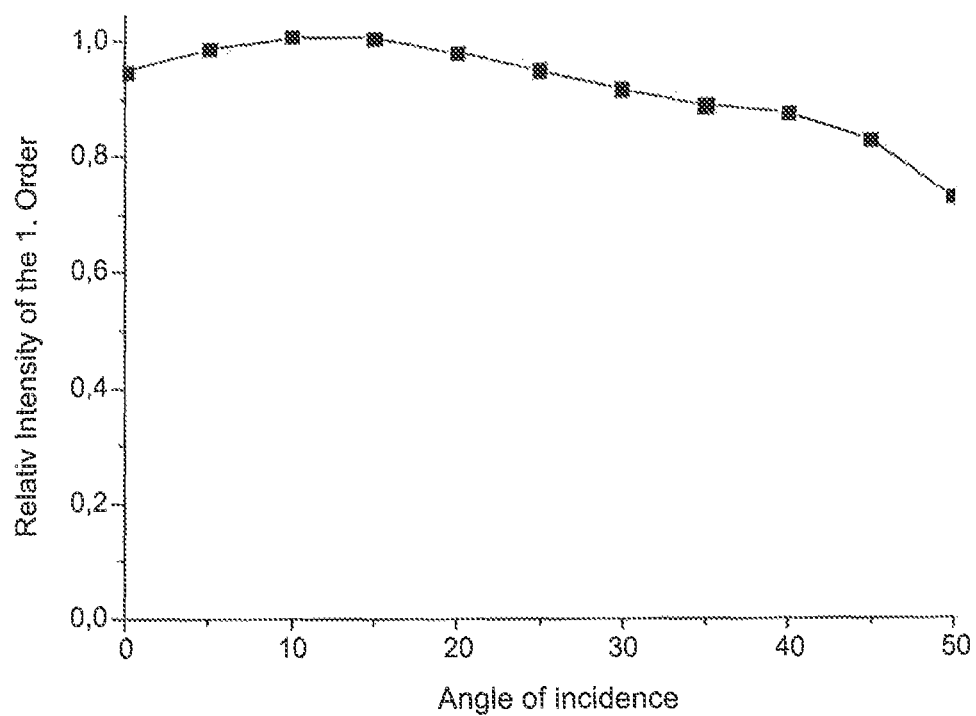

FIG. 4 shows the dependency of the intensity in a $1^{st}$ diffraction order on the angle of incidence when circularly polarized light passes through a polarization grating according to the invention according to FIG. 3. Compared with FIG. 2, a much higher diffraction efficiency is achieved in the $1^{st}$ order in a wide angle of incidence range.

Figure 5:
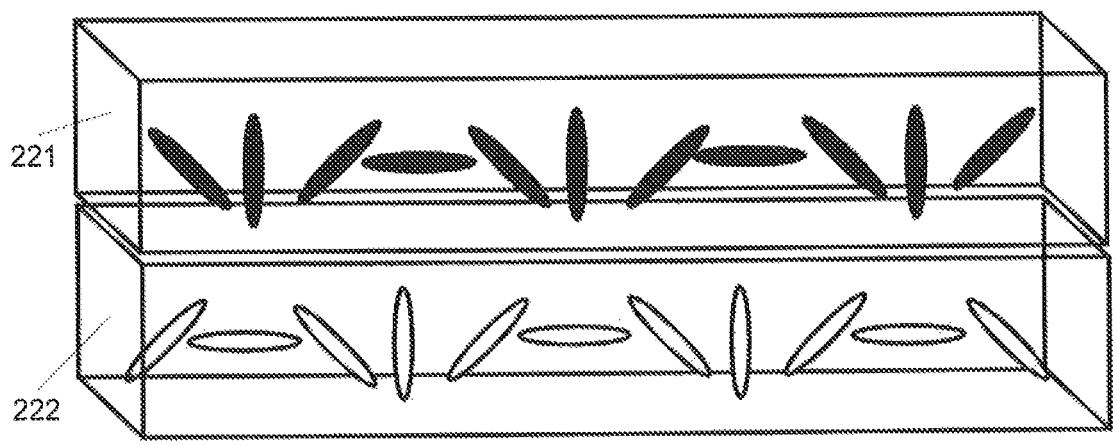

FIG. 5 shows another exemplary embodiment with a polarization grating having a first liquid-crystal layer 221 with a positive birefringence and a second liquid-crystal layer 222 with a negative birefringence. The two liquid-crystal layers 221, 222 are deposited successively on a first substrate (not represented here). The two liquid-crystal layers 221 and 222 are displaced relative to one another in such a way that the optical axes are rotated locally through 90° with respect to one another. For reasons of clarity, the substrates, which enclose the two liquid-crystal layers 221 and 222 stacked above one another, are not represented in the drawing. This also applies to any electrode structures which may be located on these substrates and with which such arrangements of a polarization grating, which are optimized for oblique light transit, can be configured switchably.

Figure 6:
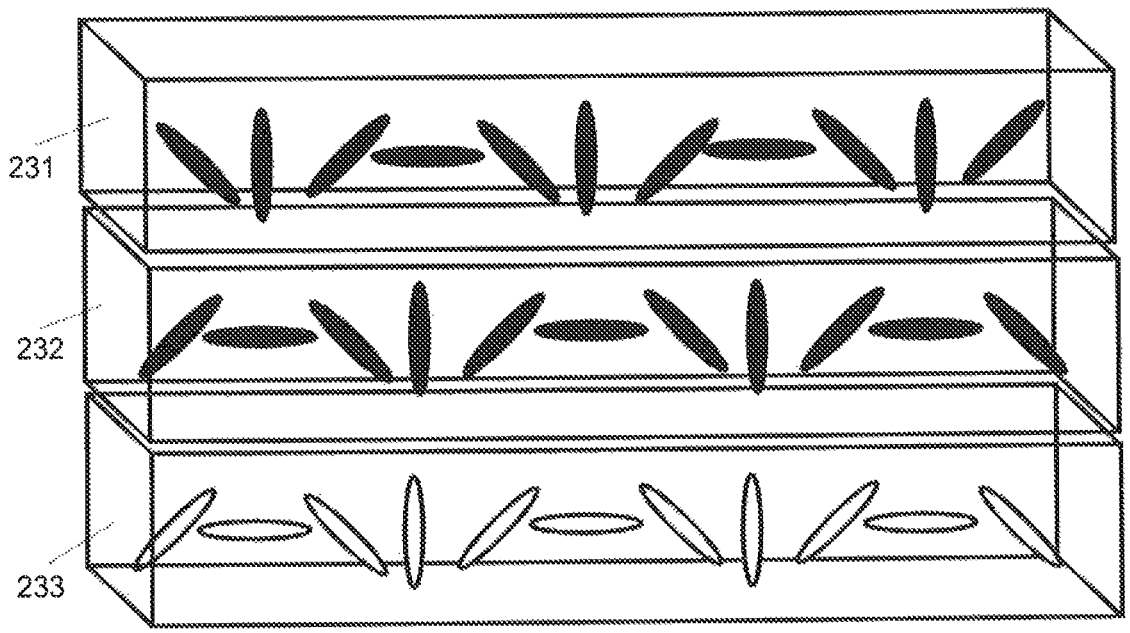

In another exemplary embodiment, a three-layer polarization grating is configured in such a way that two liquid-crystal layers have the same sign of the birefringence and a further liquid-crystal layer has an opposite sign of the birefringence. Purely by way of example, the two liquid-crystal layers 231 and 232 in FIG. 6 have a positive birefringence, the grating profile of the optical axes in these two liquid-crystal layers being rotated locally through 90° with respect to one another. The liquid-crystal layer 233, conversely, has a negative birefringence. Its grating profile of the optical axis may extend parallel to the first liquid-crystal layer 231 or parallel to the second liquid-crystal layer 232. A profile parallel to the liquid-crystal layer 232 is represented in FIG. 6.

Figure 7A:
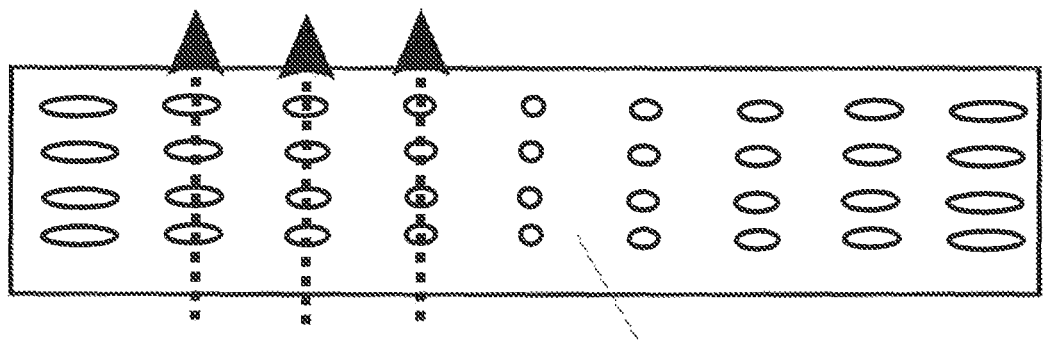

FIG. 7 shows another exemplary embodiment, which advantageously requires only one liquid-crystal layer 240. For comparison, FIG. 7a represents a polarization grating without an additional twist or the liquid-crystal molecules perpendicularly to the liquid-crystal layer 240, which has been optimized for normal light entry, or in which a voltage is applied by means of an electrode structure (not represented) in such a way that the liquid-crystal molecules experience no twist. The light rays in this case respectively strike liquid-crystal molecules with the same rotation angle of the birefringence axis. In the lateral direction, the rotation angle varies periodically, which leads to the desired periodic phase change. Light rays which strike the liquid-crystal layer 240 obliquely would strike molecules with a different rotation angle on their path through the liquid-crystal layer 240. In the least favorable case, all light rays would thereby experience the same phase retardation, so that no light would be diffracted into a $1^{st}$ diffraction order.

Figure 7B:
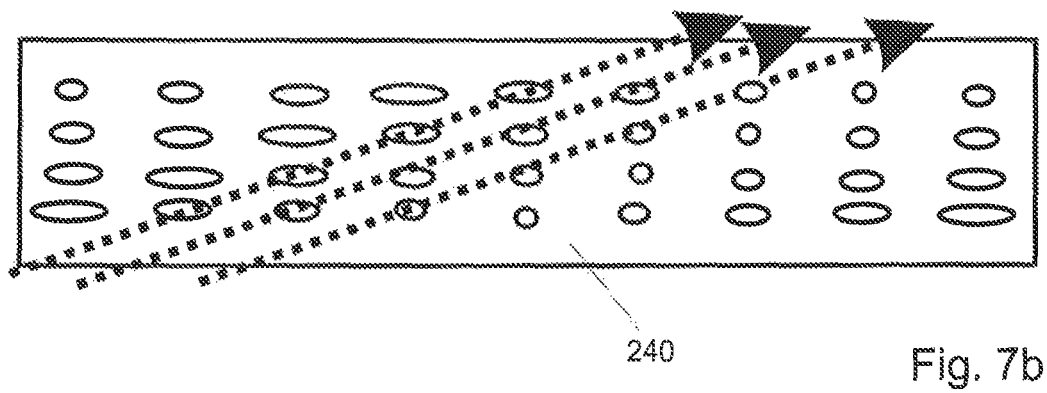
Figure 7C:
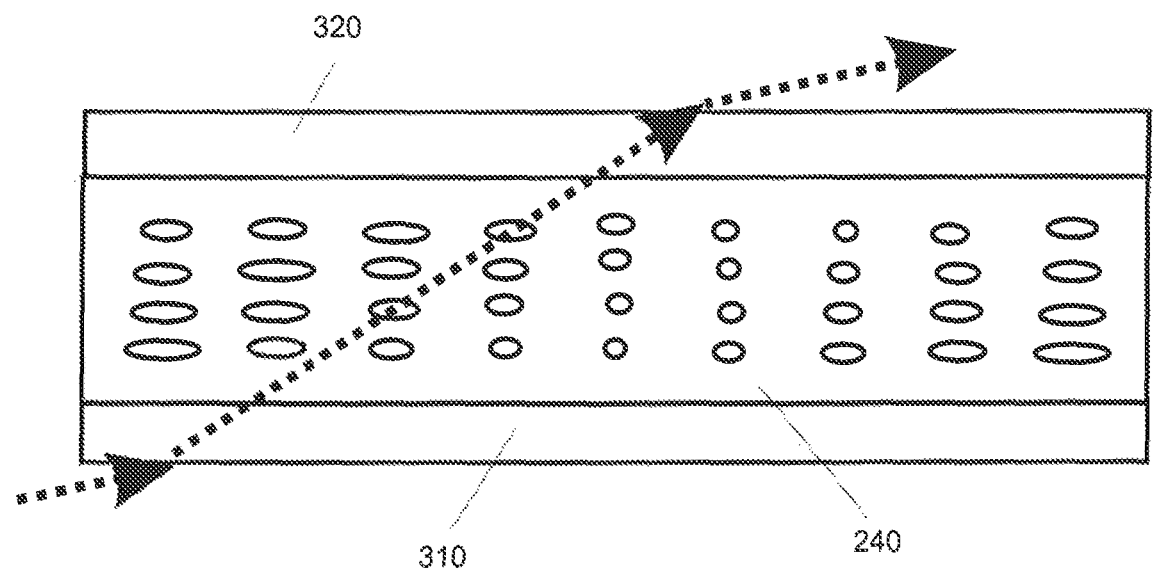

In the polarization grating according to the invention according to FIG. 7b, the liquid-crystal molecules of the liquid-crystal layer 240 have an additional twist perpendicularly to the liquid-crystal layer. The strength of the twist is in this case adapted to the desired angle of incidence, so that the light rays strike molecules of the same rotation angle on their path through the liquid-crystal layer 240. The rotation angle therefore varies both in the horizontal direction and perpendicularly to the liquid-crystal layer.

The liquid-crystal layer 240 is located in a known way between two substrates (also not represented here). If the upper and lower substrates are equipped with suitable electrode structures, by applying a voltage profile the strength of the twist can be influenced in such a way that adaptation of the polarization grating to the angle of incidence can take place controllably.

In most figures, the light profile is represented purely schematically. In fact, however, the rays already experience a light deflection when entering the cell, which depends on the size of the refractive index difference. Usually, the transition is from air into glass. This is demonstrated in FIG. 7c. The liquid-crystal layer 240 corresponds substantially to FIG. 7b. It has, however, been optimized for a smaller angle of incidence, or the twist angle adjusted by applying a voltage to an electrode structure (not represented) is less. When the light enters the substrate 310, the light already experiences a deflection. If the refractive index of the liquid-crystal layer differs from that of the substrate, a further light deflection takes place at the interface between the substrate 310 and the liquid-crystal layer 240. At the transition from the liquid-crystal layer 240 into the second substrate 320, a further deflection may take place. When the light emerges from the second substrate 320, the light experiences a further deflection according to the law of refraction. This exit usually takes place from glass to air. Since the light passing through the polarization grating experiences a periodic phase change at the liquid-crystal molecules, they interfere with one another and are diffracted in the desired direction.

Figure 8:
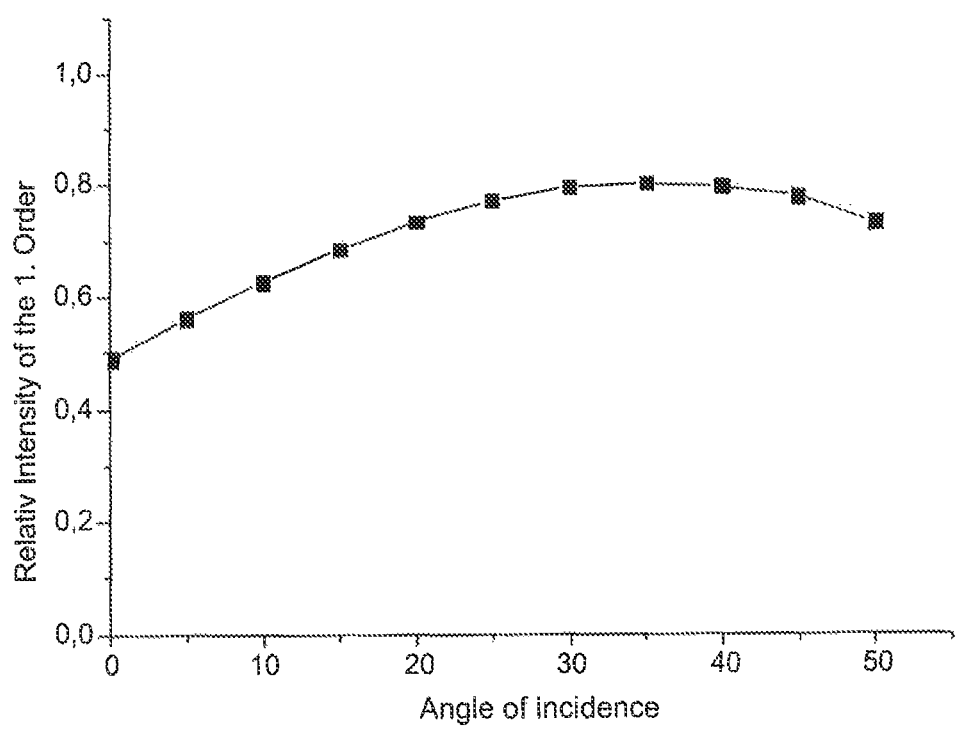

FIG. 8 demonstrates simulation results for the diffraction efficiency in a 1$^{st}$ diffraction order as a function of the angle of incidence for a polarization grating according to FIG. 7b. The polarization grating is optimized for an angle of incidence of about 37.5° in air. In this range, a maximum diffraction efficiency is achieved. As in FIG. 2, the grating period is likewise $\Lambda=2$ μm, and $d=1.5$ μm has been selected for the thickness of the liquid-crystal layer. The average refractive index of the liquid-crystal layer is 1.5. This corresponds to an angle α' in the liquid-crystal layer of 24 degrees. The rotation angle of the twist is about τ=60° and is calculated according to the formula $\tau=d*\tan(\alpha')*180°/\Lambda$. From the simulation results, it can be seen that a maximum diffraction efficiency is obtained at an angle of incidence of about 35°-40°. With normal light incidence, the diffraction efficiency is clearly less. Besides the strength of the twist, for the optimization of a polarization grating for oblique light incidence, the thickness of the liquid-crystal layer and/or the strength of the birefringence of the liquid-crystal material should also be adjusted according to the desired working wavelength in such a way that the optical wavelength variation within the polarization grating corresponds as far as possible to one half wavelength of the incident light.

Figure 9A:
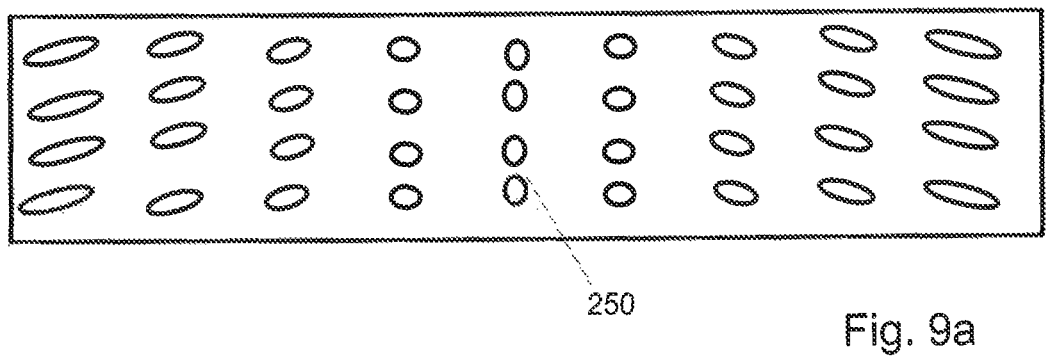
Figure 9B:
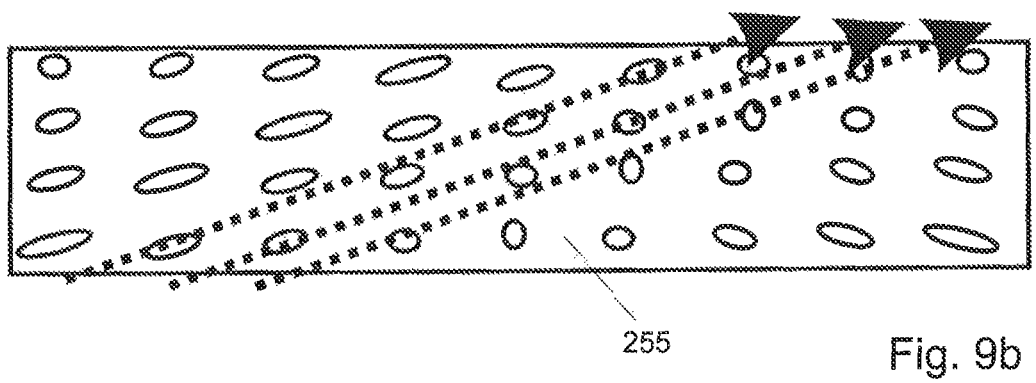

FIGS. 9a and 9b demonstrate a liquid-crystal layer 250, in which the liquid-crystal molecules have an additional tilt. FIG. 9a shows a polarization grating for perpendicular light transit. In FIG. 9b the polarization grating is optimized for oblique light transit. There is therefore a further possibility of adjusting the optical birefringence along the light path in such a way that a high diffraction efficiency is achieved in a first order. Such a grating may also be equipped with suitable electrode structures, which may also be configured in a grid, in order to controllably influence the tilt angle.

It is also possible to combine a twist and tilt of the liquid-crystal molecules.

Figure 10:
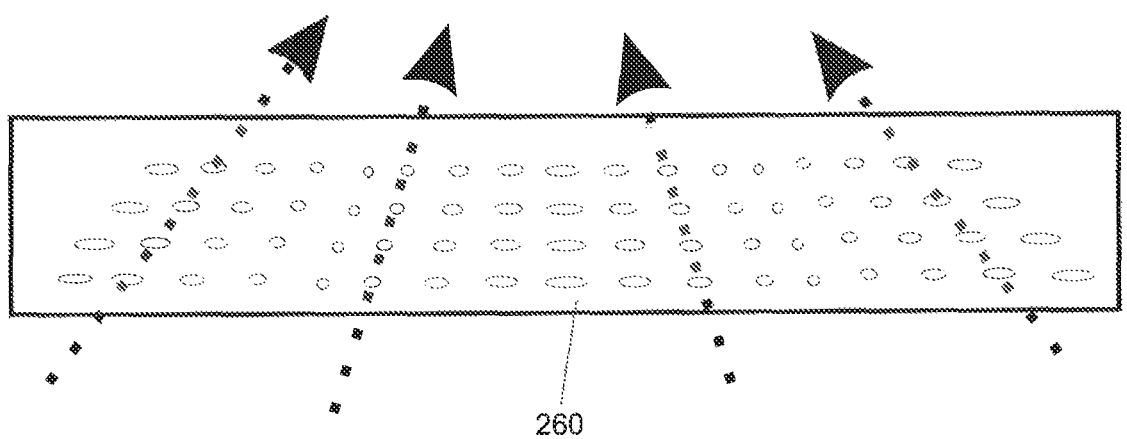

FIG. 10 schematically shows an arrangement in which the strength of the twist of the liquid-crystal molecules perpendicularly to the liquid-crystal layer 260 is varied as a function of the position inside the area of the liquid-crystal layer 260. In this way, the polarization grating can be adapted to a locally varying entry angle or angle of incidence, such as it may for example be behind a field lens. In general, the polarization grating will be configured in such a way that the strength of the twist varies over distances which are large compared with the grating period. If the substrates (not represented here) are equipped with a suitably gridded electrode structure, the polarization grating may also be adapted controllably to time-varying entry angle distributions.

Figure 11:
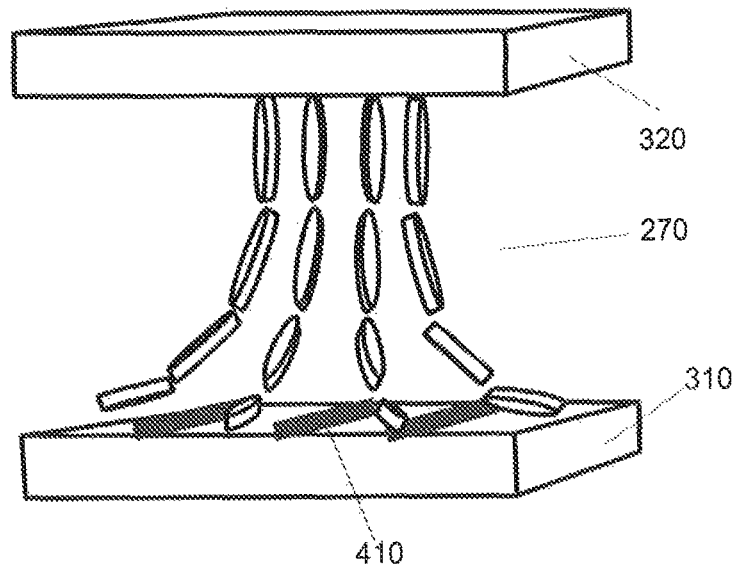

FIG. 11 schematically shows a detail of the liquid-crystal layer 270 of an adjustable polarization grating with a hybrid alignment of the liquid-crystal molecules according to the prior art. With individually drivable strip-shaped electrodes 410 on the lower substrate 310, the orientation of the liquid crystals can be adjusted by applying a periodic voltage profile to these electrodes 410 in such a way that the desired grating period and therefore the desired direction of deflection is obtained in accordance with the working wavelength. Since the liquid-crystal molecules are aligned perpendicularly on the upper orientation layer (not represented), which is located on the side of the upper substrate 320 facing toward the liquid crystals, it is not possible to adjust an additional twist of the liquid-crystal molecules by strip-shaped electrodes on this substrate, in order to optimize the diffraction efficiency for oblique light incidence into the liquid-crystal layer.

Figure 12:
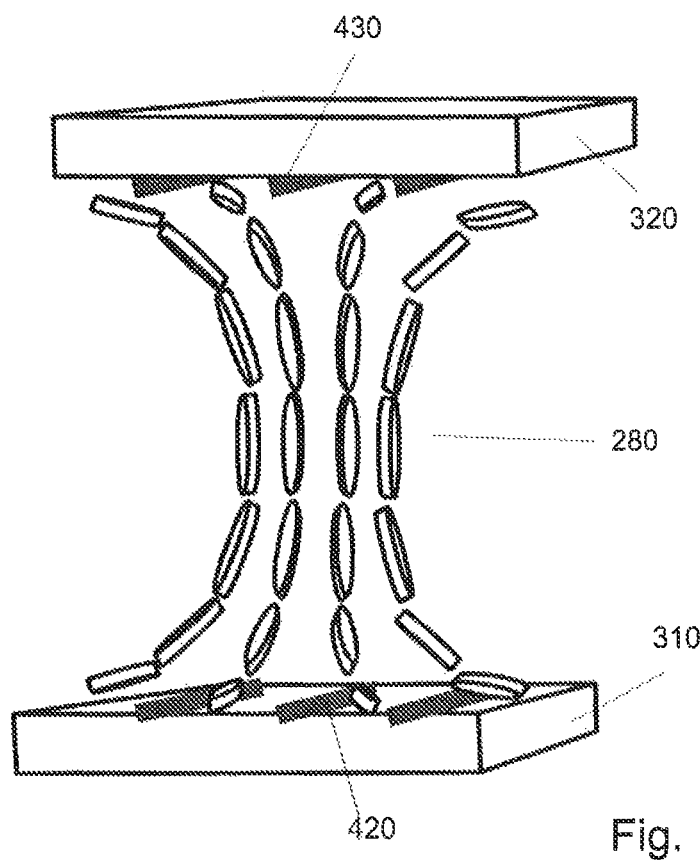
Figure 13:
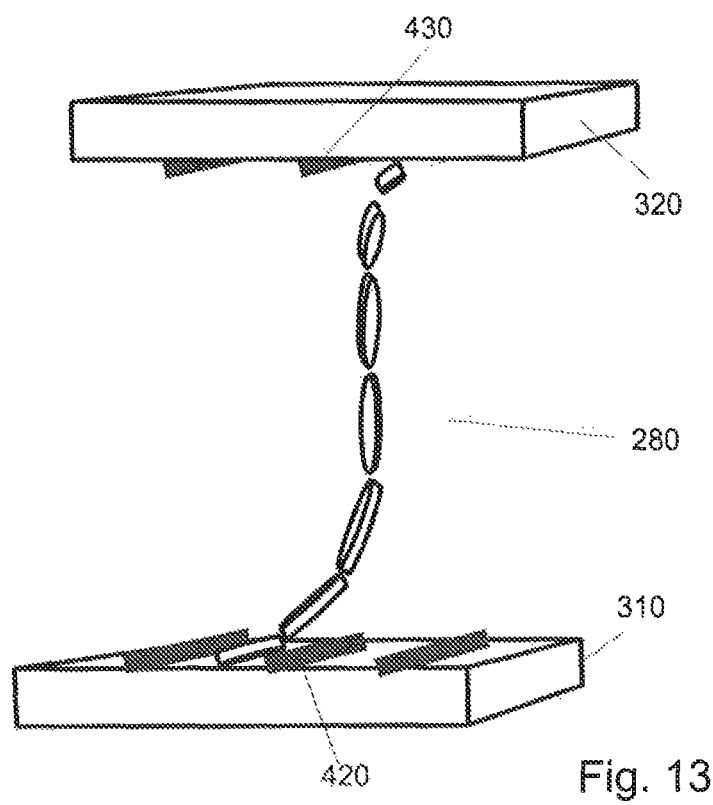

Instead of this, FIG. 12 shows a detail of a liquid-crystal layer 280 of an exemplary embodiment of a controllable polarization grating, which is based on a bent structure of the liquid-crystal orientation (bend). Here, the liquid-crystal molecules of the liquid-crystal layer 280 are arranged parallel to the two substrates 310 and 320 by alignment layers (not represented). By applying a variable voltage profile to an additional electrode structure 430 on the upper substrate 320, an additional twist of the liquid-crystal molecules can be adjusted, as represented schematically in FIG. 13. In this way, for varying angles of incidence, not only can the grating be adjusted in its direction of deflection, but also the diffraction efficiency of this deflected light can be controllably optimized as a function of the angle of incidence. By applying suitable periodic voltage patterns to the lower and upper gridded electrode structure 420, 430, in such a polarization grating it is also possible to variably adjust the grating period, and therefore the angle of deflection.

Lastly, it should more particularly be pointed out that the exemplary embodiments explained above merely serve to describe the claimed teaching, but do not restrict this to the exemplary embodiments. In particular, the exemplary embodiments described above could—insofar as possible—be combined with one another.

The invention claimed is:

1. A polarization grating for deflecting light of a predeterminable polarization, optimized for a fixed or variable oblique angle of incidence of light, comprising at least one liquid-crystal layer on a substrate, the liquid-crystal layer containing liquid-crystal molecules having a first periodic variation, in one or two mutually orthogonal directions within the plane of the liquid-crystal layer, of their orientation;

the liquid crystal molecules having at least a second orientation variation, said second orientation variation being adjusted according to the fixed oblique angle of incidence of light or adjustable according to the variable oblique angle of incidence of light by an electrode structure in such a way that incident light experiences a predeterminable phase retardation when passing through the liquid-crystal layer;

said at least second orientation variation of the liquid crystal molecules being formed as a twist, where a rotation angle of the twist is adjusted or adjustable to a value $\tau=180°\cdot d\cdot\tan(\alpha')/\Lambda$, where d is the thickness of the liquid-crystal layer, α' is the angle at which the light ray with the angle of incidence α propagates in the liquid-crystal layer and Λ is the grating period, and the diffraction efficiency in the $+1^{st}$ or $-1^{st}$ diffraction order being maximized for an angle of incidence of light provided in a range between 20° and 50°.

2. The polarization grating as claimed in claim 1, wherein the light experiences a maximum diffraction efficiency in the +1st or −1st diffraction order when passing through the liquid-crystal layer.

3. The polarization grating as claimed in claim 1, wherein it is formed as a grating whose grating period can be controlled, with a controllable periodic variation, within the plane of the liquid-crystal layer, of the orientation, and at least one further controllably adjustable orientation variation.

4. The polarization grating as claimed in claim 1, wherein it is formed as a passive grating with a fixed periodic variation of the orientation within the plane of the liquid-crystal layer, and at least one further fixed orientation variation.

5. The polarization grating as claimed in claim 1, wherein it is formed as a switchable grating with a fixed periodic variation of the orientation within the plane of the liquid-crystal layer, and at least one further switchably or controllably adjustable orientation variation.

6. The polarization grating as claimed in claim 1, wherein the part of the orientation of the liquid-crystal molecules in the plane of the at least one liquid-crystal layer and the part of the orientation of the liquid-crystal molecules outside the plane of the liquid-crystal layer determine the profile of the birefringence of the liquid-crystal layer as a function of position.

7. The polarization grating as claimed in claim 1, wherein the liquid-crystal molecules in the plane of the liquid-crystal layer are periodically rotated relative to one another at least in one direction, and additionally have a twist perpendicularly to the liquid-crystal layer, the rotation angles of the twist being displaced along the liquid-crystal layer in such a way that light rays with a predeterminable angle of incidence strike positions of equal rotation angle when passing through the liquid-crystal layer.

8. The polarization grating as claimed in claim 7, wherein the twist is predetermined by means of the concentration and type of a chiral dopant, which is admixed with the liquid-crystal layer.

9. The polarization grating as claimed in claim 7, further comprising at least a second substrate, the liquid-crystal layer being located between the substrates and the rotation angle of the twist of the liquid-crystal molecules is predetermined by the mutual lateral displacement of one alignment layer respectively on each substrate.

10. The polarization grating as claimed in claim 7, wherein the thickness of the liquid-crystal layer is adapted to a preferred angle of incidence and a preferred wavelength in such a way that the phase change of the light between ordinary and extraordinary rays when passing through the liquid-crystal layer substantially corresponds to one half wavelength at this angle of incidence and this wavelength.

11. The polarization grating as claimed in claim 7, wherein the displacement of equal rotation angles of the twist between the upper and lower sides of the liquid-crystal layer corresponds substantially to one half grating period.

12. The polarization grating as claimed in claim 1, wherein at least one optically rewritable alignment layer is contained.

13. The polarization grating as claimed in claim 1, wherein it contains a suitable electrode structure, with which the orientation of the liquid-crystal molecules in the liquid-crystal layer can be modified by applying a suitable voltage profile.

14. The polarization grating as claimed in claim 13, wherein it contains an alignment layer with fixed structuring on one substrate and a second substrate with a comb-like electrode structure for twisting the liquid molecules relative to this alignment layer.

15. The polarization grating as claimed in claim 1, wherein the polarization grating contains a plurality of liquid-crystal layers lying behind one another, equal rotation angles of the twist being displaced along the liquid-crystal layers in such a way that light rays with a predeterminable angle of incidence strike positions of equal rotation angle when passing through the liquid-crystal layers.

16. The polarization grating as claimed in claim 1, wherein it contains at least one further liquid-crystal layer, of which the sign of the birefringence of the liquid-crystal molecules differs from the first liquid-crystal layer, and both liquid-crystal layers have the same grating period.

17. The polarization grating as claimed in claim 1, wherein at least one substrate comprises a fine-structured electrode structure of individually drivable electrodes, in order to control the rotation angle of the twist of the liquid-crystal molecules by applying a variable voltage profile to the electrode structure in one or two directions in the plane of the liquid-crystal layer, in such a way that light rays with a variable angle of incidence strike positions of equal rotation angle when passing through the one or the plurality of liquid-crystal layers.

18. The polarization grating as claimed in claim 17, wherein the exit angle of the light rays after passing through the at least one liquid-crystal layer can be controlled by varying the period of the voltage profile.

19. The polarization grating as claimed in claim 1, wherein the period of the variation of the orientation of the liquid-crystal molecules is locally variable in one or two directions in the plane of the liquid-crystal layer.

20. An arrangement for one- or two-dimensional fixed or variable light deflection, wherein at least one polarization grating as claimed in claim 1 is contained in the arrangement.

21. An arrangement for the reconstruction of holographically encoded three-dimensional scenes, wherein at least one polarization grating as claimed in claim 1 is contained in it.

22. An arrangement for directing sunlight onto a photosensitive surface, wherein at least one polarization grating as claimed in claim 1 is contained in it.

23. A method for one- or two-dimensional fixed or variable light deflection, wherein the light deflection is carried out partially or fully with at least one polarization grating as claimed in claim 1.

24. The polarization grating as claimed in claim 1, wherein the angle of incidence of light is about 35°-40°; the rotation angle of the twist is about $\tau=60°$.

* * * * *